US011290380B2

(12) United States Patent
Raiciu et al.

(10) Patent No.: US 11,290,380 B2
(45) Date of Patent: Mar. 29, 2022

(54) METHOD FOR TRANSFERRING INFORMATION ACROSS A DATA CENTER NETWORK

(71) Applicant: S.C Correct Networks S.R.L., Bucharest (RO)

(72) Inventors: Costin Raiciu, Bucharest (RO); Mark James Handley, Kingston (GB)

(*) Notice: Subject to any disclaimer, the term of this patent is extended or adjusted under 35 U.S.C. 154(b) by 0 days.

(21) Appl. No.: 16/943,245

(22) Filed: Jul. 30, 2020

(65) Prior Publication Data

US 2022/0038371 A1 Feb. 3, 2022

(51) Int. Cl.
*H04L 12/865* (2013.01)
*H04L 45/74* (2022.01)
*H04L 47/34* (2022.01)

(52) U.S. Cl.
CPC .............. *H04L 45/74* (2013.01); *H04L 47/34* (2013.01); *H04L 2212/00* (2013.01)

(58) Field of Classification Search
CPC .............. H04L 63/164; H04L 12/4633; H04L 63/0428; H04L 47/34; H04L 43/12; H04L 45/74; H04L 69/22; H04L 47/624; H04L 45/22; H04L 45/308; H04L 45/741; H04L 1/1887; H04L 47/6215; H04L 47/6275; H04L 2212/00; H04L 29/06; H04L 12/46; H04L 12/26; H04L 12/41; H04L 12/801; H04L 12/28; H04L 12/863; H04L 12/56; H04L 12/725; H04L 12/707; H04L 12/865; H04L 1/18; H04L 1/08; H04J 3/22
USPC ........................................................ 370/392
See application file for complete search history.

(56) References Cited

U.S. PATENT DOCUMENTS

| | | | | |
|---|---|---|---|---|
| 7,808,983 | B2 * | 10/2010 | Joly | H04L 47/24 370/389 |
| 8,880,681 | B2 * | 11/2014 | Moncaster | H04L 43/08 709/224 |
| 8,937,950 | B2 * | 1/2015 | Dunbar | H04L 12/462 370/392 |
| 9,019,990 | B2 * | 4/2015 | Jaiswal | H04L 69/22 370/474 |
| 9,084,132 | B2 * | 7/2015 | Briscoe | H04W 24/02 |
| 9,369,398 | B2 * | 6/2016 | Chan | H04L 45/308 |
| 9,497,039 | B2 * | 11/2016 | Greenberg | H04L 12/4633 |
| 9,544,239 | B2 * | 1/2017 | Gafni | H04L 47/32 |
| 10,038,766 | B2 * | 7/2018 | Pfister | H04L 45/742 |

(Continued)

FOREIGN PATENT DOCUMENTS

WO WO2012135442 A1 10/2012

OTHER PUBLICATIONS

Handley, M., "Re-architecting datacenter networks and stacks for low latency and high performance" SIGCOMM '17, Aug. 21-25, 2017, Los Angeles, CA, USA, pp. 29-42.

(Continued)

*Primary Examiner* — Man U Phan
(74) *Attorney, Agent, or Firm* — Benjamin D. Rotman; Golan Christie Taglia LLP (57) ABSTRACT

Packets in a data communications network are encapsulated by an encapsulation module on a sending computer and decapsulated on the receiver computer, the transmission of data packets being controlled by credit sent by the receiving computer. When overloaded, network switches trim the payload from packets; trimmed packets inform the receiving computer of the demands of the sending computer.

19 Claims, 3 Drawing Sheets

(56) References Cited

U.S. PATENT DOCUMENTS

| | | | |
|---|---|---|---|
| 10,044,628 B2* | 8/2018 | Chan | H04L 45/741 |
| 2005/0243834 A1* | 11/2005 | Fukuda | H04L 45/40 370/395.1 |
| 2010/0095021 A1 | 4/2010 | Samuels | |
| 2010/0322249 A1 | 12/2010 | Thathapudi | |
| 2019/0104207 A1 | 4/2019 | Goel | |
| 2020/0366610 A1* | 11/2020 | Wang | H04L 47/35 |
| 2021/0258347 A1* | 8/2021 | Batta | H04L 45/74 |

OTHER PUBLICATIONS https://www.youtube.com/watch?v=BO0QhaxBRr0 (Aug. 22, 2017).
International Search Report and Written Opinion issued in corresponding foreign application, PCT/IB2021/056200, pp. 1-22 (dated Nov. 30, 2021).

* cited by examiner

Figure 1 Prior Art

Figure 2 Encapsulation and Decapsulation

METHOD FOR TRANSFERRING INFORMATION ACROSS A DATA CENTER NETWORK

BACKGROUND OF THE INVENTION

The present invention relates to a method for transferring information across a data center network, and in particular to transfers of information between computers using legacy network protocols across a network comprising of a plurality of packet switches that provide a plurality of possible paths from a source computer to a destination computer.

The invention provides improved control over the order in which information is received when network links are running at full capacity, reduces the latency of information transfer, and reduces interference between different traffic flowing to different computers via shared network links.

Data center networks interconnect large numbers of computers and are used to transfer information both between computers in the data center and between computers in the data center and computers on external networks. Such networks are constructed from a multitude of interconnected network switches. Examples of such switches are Ethernet switches, Infiniband switches and IP routers. To interconnect large numbers of computers, many switches are interconnected in such a way that if two computers are not directly connected to the same switch, then there are multiple paths though the network that packets of data sent between those computers might traverse.

One way to determine which path a packet takes is for the switches to run a routing protocol so as to determine multiple possible paths to the destination computer, and then to use a hash function of fields from the packet to choose between paths. If the fields being hashed have the same values in all the packets of an information transfer, then all the packets will traverse the same path through the network, and so will typically arrive in the order in which they were sent.

Having packets arrive in the correct order helps network performance because computers often use conventional legacy network protocols such as the Transmission Control Protocol (TCP) to manage the transfer of data, avoid persistently overloading the network or the receiver, and resend any packets that get corrupted or otherwise lost in transit. TCP generally loads the network to capacity until a queue in a network switch overflows. At this point a packet will be lost, and TCP infers from this loss that it should reduce the transmission rate. When packets arrive out of order, TCP can mistake this for loss, and performance can suffer. TCP's requirement to fill a queue to sense network capacity also increases latency across the network for other packets that traverse the same queues.

Another data center network protocol is Remote Direct Memory Access (RDMA). RDMA suffers performance problems when packets are lost, so it is common for a switch in a network deploying RDMA to tell the preceding switch or computer to pause sending more data until there is more link capacity available. This pausing can cause unnecessary latency for packets destined for other computers.

NDP addresses these problems by replacing the entire network transport protocol with a new protocol and by modifying the network switches. Once a queue in a switch reaches a certain size, new arriving packets are trimmed so that the payload is removed and only the NDP header remains. As the NDP header is small, many more trimmed packets can be sent than if they were not trimmed. These trimmed packets serve to tell the receiver which senders are trying to send. The NDP receiver then requests more data from the senders at a rate at which it can cope. In addition, because the switches do not often need to drop packets, different packets from the same transfer can be sent across different paths without the receiver confusing out-of-sequence packet arrival for packet loss.

NDP requires that the complete end-system software stack will be replaced by NDP, whereas this is often difficult or expensive to arrange for data center customers, as it will require software to be re-written.

What is needed is a method for transferring data between computers in a data center in a manner that can effectively use multiple network paths while providing high throughput and low latency, while allowing computer operating systems or applications to use existing network protocols. It is also required that such a method poses minimal load on the CPU of the computers concerned, while providing effective isolation or prioritization of incoming network traffic flows.

SUMMARY OF THE INVENTION

It is an object of this invention to enable the transfer of data across a data center network comprising a plurality of network switches and network paths between computers in such a manner that high throughput can be achieved without requiring large buffers in network switches.

It is an additional object of this invention to allow the transfer of data across a data center network comprising a plurality of network switches and network paths in such a manner that packets are load-balanced across those diverse paths while the sending and receiving computers use commonly used network protocols that do not tolerate well the reordering of packets sent.

It is an additional object of this invention to maintain congestion information about the network paths at the sender and receiver, and to use this information to load-balance traffic in a dynamic manner to reduce overall congestion and improve performance.

It is an additional object of this invention to provide isolation between incoming network traffic sent from multiple source computers using commonly used legacy network protocols sending to a single destination computer.

It is an additional object of this invention to provide unequal prioritization of incoming network traffic sent from multiple source computers using commonly used legacy network protocols to a single destination computer, with the priorities of incoming traffic determined by the destination computer.

It is an additional object of this invention to enable the transfer of data across a data center network with low latency while using the capabilities of the network interface card at the sending or receiving computer to reduce the demands on that computer's CPU.

It is an additional object of this invention to allow the receiver of network flows that send traffic in an intermittent bursty manner to have control over incoming bursts of traffic so that any disruption that such bursts of traffic might cause is reduced.

Still other objects and advantages of the invention will in part be obvious and will in part be apparent from the specification and drawings.

In order to spread traffic across multiple paths through a data center, the present invention sends each packet with header fields that are read by the network switches and used to determine a path through the network to the destination computer. By varying the header fields used by the switches to determine the path to the destination, a sending computer can influence which packets traverse which path through the data center and so balance load across multiple paths more effectively.

A problem arises in a data center when incoming traffic from many sources concentrates as it nears the destination computer. In the present invention, small buffers are used in switches, which minimize additional queuing delays. When arriving packets overflow the queue in a switch, that switch trims off the payload and forwards only the header to the destination computer. In this way, the destination computer discovers which computers are trying to send it data.

In the present invention, packet headers also contain sequence numbers which indicate either the number of the packet sent or the position of the bytes of the packet payload in a bytestream. When packets are trimmed rather than dropped, the present invention allows the receiving computer to infer that a gap in the sequence numbers of incoming packets is caused by them having taken different paths and so arrive out of order. In contrast, if packets were to be dropped, as is common in the art, then the receiver could not quickly distinguish between reordered packets and dropped packets.

One embodiment of the invention relies on the receiving network interface card (NIC) sending control packets to the computers attempting to send data, whereby each control packet gives a credit to a single sender allowing that sender to transmit a certain number of packets or bytes of data. In another embodiment, these credit control packets are sent by the software running on the receiving computer's CPU. In the present invention, the sending of these credits is paced so that the rate of incoming packets they elicit matches the available capacity at the receiver or of the incoming network link to the receiver.

Multiple flows of packets may arrive from multiple data senders simultaneously at the receiving computer. By controlling how credits are sent to different senders, the present invention can control how much data arrives on each of those incoming flows, allowing the receiver to enforce isolation between those flows.

In another embodiment, the receiving host operating system or NIC can be configured with unequal shares and credit control packets are sent to senders in proportion to these shares, so that different incoming flows to that computer are permitted to share the incoming network link in proportion to these shares.

The present invention allows applications running on the source and destination computers to use unmodified commonly used legacy network protocols. Packets sent by a legacy network protocol may be queued in the sending computer until a credit control packet from the receiving computer is received allowing transmission. This queuing may be managed by the sending computer's operating system, by application software running on the sending computer that intercepts the outgoing packets, or by the NIC, so that the sending legacy protocol is unaware that credit control is used. Such packets then have an additional header added before they are transmitted across the network. If a switch queue on the packet's path to the receiver starts to become full, rather that dropping the packet, the payload is trimmed from the packet, and only the header is forwarded. The receiving computer or NIC, on receipt of such a trimmed packet header, can understand precisely which data is missing. The computer or NIC then sends a control packet to the sending computer, requesting a retransmission take place. The sending computer or NIC receives this control packet and requeues the missing data ready for retransmission when sufficient credit is received. In this way, fast retransmission of data can take place without the original legacy network protocol at either the sender or receiver being aware that the original packet had its payload removed by the overloaded switch.

When a sending computer starts sending a burst of packets, it cannot know in advance how fast to send because it does not know how many other senders are sending at that time. To reduce communications latency, with the present invention, a sender may start sending as fast as possible. If this causes a switch queue to fill, packets may be trimmed, and the receiver can request their retransmission when network capacity allows. When a sender repeatedly sends bursts, the present invention allows the receiving computer to control how rapidly such new bursts are sent, depending on how busy the network is in the vicinity of the receiver.

The invention accordingly comprises the several steps and the relation of one or more of such steps with respect to each of the others, and the apparatus embodying features of construction, combinations of elements and arrangement of parts that are adapted to affect such steps, all is exemplified in the following detailed disclosure, and the scope of the invention will be indicated in the claims.

BRIEF DESCRIPTION OF THE DRAWINGS

For a more complete understanding of the invention, reference is made to the following description and accompanying drawings, in which.

DETAILED DESCRIPTION OF THE PREFERRED EMBODIMENTS

Figure 1:
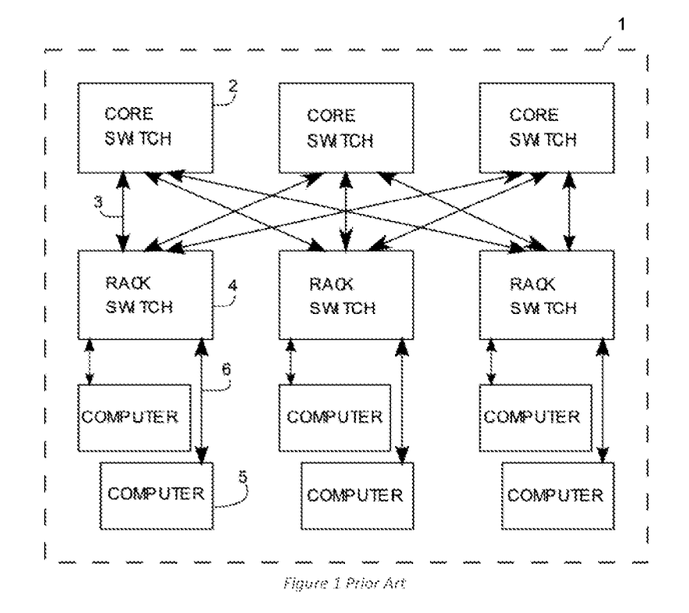
FIG. 1 is an example of a data center network topology.

FIG. 1 shows an exemplary data center network [1], as known in the art. A plurality of computers [5] are connected to edge switches [4] via network links. Edge switches are themselves interconnected via inter-switch links [3] to other net-work switches [2]. In this way packets of data sent by a computer connected to one switch may be forwarded to a computer connected to a different switch via a plurality of network paths. It will be understood that data center topologies in which the present invention is used will encompass many more computers connected to each switch, more switches and more layers of switches than shown in FIG. 1, and that different topologies are also possible.

Whereas it is common in prior art for a flow of packets from one computer to another computer to take a single path through the network to avoid being reordered, in the preferred embodiment of the present invention different packets of a single flow deliberately take different paths through the network so as to load-balance traffic across multiple paths and avoid inadvertent congestion.

In the prior art, switches compute a hash function of fields in each packet header that are consistent for all packets in a flow, and use the calculated hash to select a consistent path.

In the present invention, the sending computer varies one or more of the fields in the packet header for each packet so that when the switches calculate the hash function, different packets traverse different paths to the destination computer [5]. This can be achieved by the sending computer encapsulating data using the User Datagram Protocol (UDP) and by varying the UDP source port. It will be understood that other encapsulation mechanisms known in the art are also possible.

When the packets comprising a flow take different paths through a network, they will experience different delays, and so may arrive out of sequence at the receiving computer. Traditional network protocols such as TCP misinterpret these out of sequence packets as indicating that packets have been lost, and react inappropriately.

Figure 2:
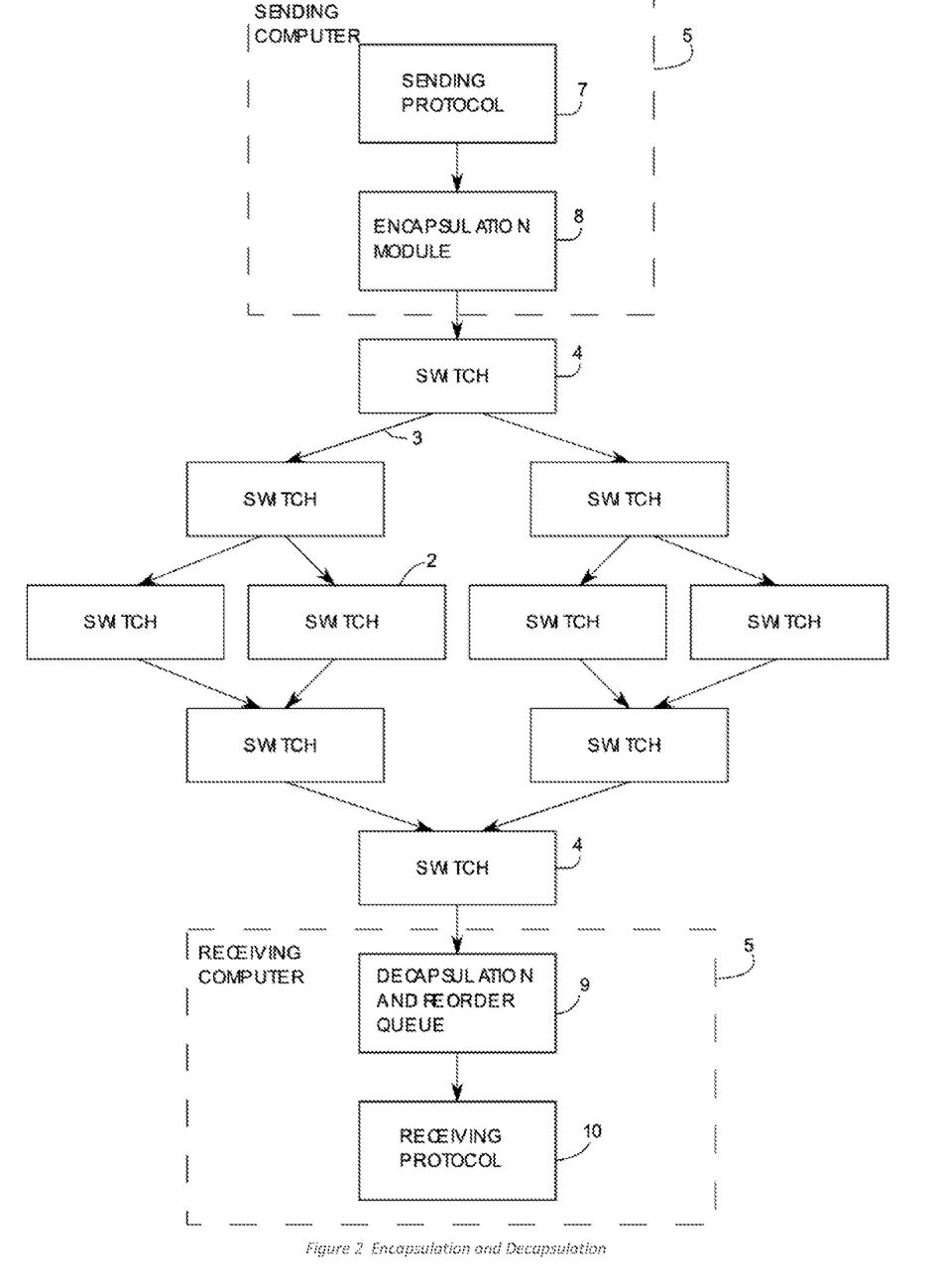
FIG. 2 shows where encapsulation, decapsulation and the reorder queue take place.

In a preferred embodiment, shown in FIG. 2, the encapsulation module [8] in the sending computer adds sequence numbers to the packets before transmission, and the decapsulation module [9] uses these sequence numbers to reorder arriving packets back into the original order before passing them to a higher level protocol [10]. For example, the sending computer might encapsulate TCP packets sent by the operating system on the sending computer within UDP packets and add an additional header containing a sequence number. The sender varies the UDP source port so that the flow of packets is load-balanced across multiple network paths that traverse multiple switches [2].

On arrival at the receiving computer, the decapsulation and reorder queue [9] removes the additional packet headers and if the packet has arrived out of sequence, it is queued briefly to allow preceding packets that followed different paths to arrive. The additional sequence numbers are then used to reorder the packets back into the original order. Only then are the packets released to the receiving protocol [10]. In one preferred embodiment, the receiving protocol [10] is TCP receiving software running on the receiving computer. The receiving protocol [10] then processes the packets without knowing they traversed different paths through the network. In this way, data can be load-balanced across multiple network paths without requiring operating system or application software to be modified, while using a standardized network protocol.

It will be understood that such encapsulation of packets between the sending protocol [7] and the receiving operating system [10] are not limited to TCP packets. Packets sent by other network protocols can also be encapsulated in this way including but not limited to UDP and RDMA packets. It will also be understood that other encapsulations than UDP may be used by the encapsulation module [8] to encapsulate packets sent between the sending protocol [7] and receiving protocol [10], so long as fields in the encapsulation header can be varied so as to balance traffic across multiple paths.

A difficulty arises concerning how long the decapsulation queue [9] should wait for a missing packet before releasing queued packets that have arrived. The missing packet may have been lost because a queue in a network switch [2] or [4] filled, or it may have been delayed because it encountered a queue in a network switch on the path to the receiving computer. If the waiting packets are released too early, the receiving protocol [10] may incorrectly conclude a delayed packet has been lost, but if the waiting packets are kept too long, this adversely impacts latency, reducing application performance.

To avoid these difficulties, switch buffer sizes must be kept small so that queuing delays are bounded, but in conventional network packet switches small buffer sizes will result in increased packet losses. Network switches in the preferred embodiment do use small buffers, but when their forwarding queue starts to fill, rather than dropping newly arriving packets, the switch trims off the payload leaving the encapsulation header. In some embodiments, a small piece of the payload may also remain after trimming, due to minimum packet size limitations. As the encapsulation header is much smaller than a typical data packet, more of them can be forwarded each second. The encapsulation header is them forwarded on to the receiving computer, where it is processed by the decapsulation module [9].

At the decapsulation module [9], an arriving trimmed encapsulation packet indicates that the packet's payload was dropped by a network switch when its queue filled.

In one embodiment, the decapsulation module [9] uses the arrival of the trimmed encapsulation packet to release any packets that had been queued waiting for the packet that had been trimmed. The decapsulation module [9] can release these packets because it now knows that the missing packet will not arrive. The receiving protocol [10] will send acknowledgment information to the sending protocol [7] in its normal way, and the sending protocol [7] will retransmit the missing data in its normal way.

In the preferred embodiment, the decapsulation module [9] sends acknowledgment information to the encapsulation module [8] when untrimmed encapsulated packets arrive and it sends negative acknowledgement information to the encapsulation module [8] when trimmed encapsulated packets arrive. In this embodiment, the decapsulation module [9] does not release packets queued awaiting a trimmed packet, but it awaits a retransmission of the missing data from the encapsulation module [8].

When the encapsulation module [8] sends a packet, it keeps a local copy of that data. When a receipt acknowledgement at the encapsulation module [8] indicating that data arrived at the decapsulation module [9], the corresponding local copy may be deleted. Upon receipt of a negative acknowledgement at the encapsulation module [8], the local copy is read and used to create an encapsulated retransmission packet to be sent to the decapsulation module [9]. When such a retransmission packet arrives at the decapsulation module [9] then packets that had been queued awaiting the trimmed packet are released to the receiving protocol [10]. In this manner, neither the receiving protocol [10] or the sending protocol [7] needs to know that packets traversed diverse paths through the network or that some of them were trimmed and retransmitted.

A further problem arises in data center networks [1] when many computers [5] all start send to a single computer [5] roughly simultaneously. This is known as an incast. When this happens, the link [6] connecting to the receiving computer becomes saturated, as packets arrive at the last switch [4] faster than they can be sent over the link [6] and packets are lost.

An advantage of the present invention is that the switches may trim off the payload of encapsulated packets when such an incast occurs, forwarding the trimmed encapsulation header to the destination computer [5]. On receipt of these trimmed encapsulation headers, the decapsulation module [9] at the receiving computer [5] learns which encapsulation modules [8] are attempting to send packets.

When an encapsulation module [8] first has data to send, it sends only an initial burst of packets to the decapsulation module [9]. This initial burst is known as the initial window of packets, and the number of packets that comprise the initial window may be configured by the network operator. After sending the initial window, an encapsulation module [8] waits for control information sent to it by the decapsulation module [9]. This control information can take three forms. First, it may indicate that one or more packets were received by the decapsulation module [9]. This type of control information is known as acknowledgements. The second type of control information is a negative acknowledgement, indicating that one or more packets were not received by the decapsulation module [9], but that their encapsulation headers were received. The third type of control information conveys credits, indicating that the decapsulation module [9] wishes the encapsulation module [8] to send more packets. Credits may be expressed in terms of the number of packets or in terms of the number of bytes that the encapsulation module [8] is requested to send.

When an encapsulation module [8] receives credits, it will record the amount of credit given. It then sends either retransmitted packets if it has received negative acknowledgements or new data packets, decrementing the recorded credit by an amount equivalent to each packet sent, until insufficient credit remains. At this point the encapsulation module [8] ceases to send encapsulated data packets until it receives more credit from the decapsulation module [9].

This credit mechanism permits the decapsulation module [9] to control which encapsulation module [8] at which sending computer [5] is permitted to send packets to that receiving computer [5]. This mechanism can be used for a multitude of purposes, including allowing some sending computers [5] priority over others, ensuring all sending computers [5] receive a fair share of the incoming link [6], or measures of controlled share between these extremes.

This credit mechanism also permits the decapsulation module [9] to control the aggregate data rate of the incoming streams of packets from many simultaneous senders, after they have sent their initial windows. The decapsulation module [9] controls the aggregate incoming data rate by pacing the sending of credits to the multiple senders so that the rate of credits sent matches the bitrate of the incoming link [6], or some lower bitrate if desired. As each credit sent an encapsulation module [8] to send the equivalent amount of data to the decapsulation module [9], the incoming data rate at the last switch [4] will then approximately equal the bitrate of the incoming link [6], so avoiding further packet loss or trimming, and minimizing the buffer size required in the switch [4].

In a preferred embodiment, when a sending computer [5] starts to send to a receiving computer [5], a send queue is established in the encapsulation module [8] for packets destined to that receiver. Conceptually there are three queues for each receiver, though they may be implemented as a single pool of packets rather than as separate queues. The first queue contains packets that have not yet been encapsulated and sent to the receiver. Once a packet has been encapsulated and sent, it is removed from the first queue and added to the second queue, which contains packets that have already been sent, but have not yet been acknowledged. When a receipt acknowledgement for a sequence number arrives, the encapsulation module [8] removes the corresponding packet from the second queue. When a negative acknowledgement for a sequence number arrives, the encapsulation module [8] removes the packet from the second queue and adds it to the third queue which stored packets awaiting retransmission. When the encapsulation module [8] receives credits, it sends packets from the retransmission queue, decrementing the recorded credit by an amount equivalent to each packet sent, until insufficient credit remains. If during this process, the retransmission queue becomes empty, the encapsulation module [8] then sends packets from the first queue, again decrementing the recorded credit by an amount equivalent to each packet sent, until insufficient credit remains. If the first queue becomes empty before the recorded credit has been exhausted, the encapsulation module [8] may retain the unused credit and use it to immediately send the corresponding amount of new packets arriving in the first queue or third queues. It will be understood that these three queues need not be traditional first-in-first-out queues, but rather they represent pools of packets either awaiting transmission or awaiting acknowledgement. As they may contain packets from multiple legacy network connections, some of those connections may be more important than others. Therefore these queues may be implemented using other queuing disciplines known in the art, including but not limited to fair queuing and priority queuing.

The first queue in the encapsulation module [8] contains packets that have not yet been encapsulated and sent. Packets will be temporarily stored in this queue if the encapsulation module [8] does not currently have enough credit to send to the decapsulation module [9]. If the sending protocol [7] sends packets faster than credits arrive at the encapsulation module [8], this queue may grow. It is desirable for this queue to be able to buffer at least the initial window's worth of packets, but it is undesirable for it to grow without bounds. The encapsulation module [8] may therefore use a range of mechanisms to slow the sending protocol [7] once the queue size exceeds a threshold.

When the sending protocol [7] is TCP, the encapsulation module [8] may slow the sending protocol [7] in one of a number of ways. First, it may drop a packet from the first queue. TCP will retransmit the missing packet, but will reduce its transmission rate as it will interpret the missing packet as a congestion signal. Second, the encapsulation module [8] may use Explicit Congestion Notification (ECN) to indicate to the sending protocol [7] that it should slow down. The encapsulation module [8] may do this by setting the TCP ECN Echo (ECE) flag in TCP acknowledgements sent from the receiving protocol [10] to the sending protocol [7]. Third, the encapsulation module [8] may reduce the receive window field in TCP acknowledgements sent from the receiving protocol [10] to the sending protocol [7], so as to trigger TCP's flow control mechanism. Finally, in embodiments where the encapsulation module [8] has direct access to the state of the sending protocol [7], it may directly reduce the value of the TCP congestion window.

When the sending protocol [7] is RDMA, the encapsulation module [8] may slow the sender by sending it a pause frame or congestion notification frame using the mechanisms described in IEEE 802.1Qbb or 802.1Qau. Alternatively, in an embodiment where the encapsulation module [8] has direct access to the state of the sending protocol [7], it may directly control the RDMA pause mechanism.

The credit mechanism already mentioned allows a decapsulation module [9] to control the sending of packets from an encapsulation module [8] sending to it. When an encapsulation module [8] starts sending to a decapsulation module [9], it starts with an initial window worth of credit. The amount of credit in this initial window can be configured. For the encapsulation module [8] to be able to start sending immediately at full speed, the initial window needs to be at least as large as the bitrate of the lowest speed link on the path multiplied by the round trip time of the network. In a preferred embodiment, once the encapsulation module [8] has sent this initial window of packets, it will wait for more credit to be sent from the decapsulation module [9]. In this manner, the amount of credit is conserved; credit to send a packet is either at the sender waiting for new data from the sending protocol [7], is associated with a data packet in transit from the encapsulation module [8] to the decapsulation module [9], is at the decapsulation module [9] waiting for the right time to be sent back to the encapsulation module [8], or is associated with a control packet in transit from the decapsulation module [9] to the encapsulation module [8].

When many encapsulation modules [8] on different computers all send to the same decapsulation module [9] simultaneously, if this causes packets to be trimmed, the arriving headers still convey the corresponding credit to the decapsulation module [9], so credit is conserved. If a packet is lost for any reason, no negative acknowledgement will arrive at the encapsulation module [8]. To ensure packets are retransmitted, a retransmission timer is run in the encapsulation module [8], and a timeout value is set for each packet sent. If an acknowledgement or negative acknowledgement arrives for a packet, the corresponding timeout is canceled. If the retransmission timer for a packet expires, that packet should be immediately retransmitted without using any credit. In this way, a loss does not cause a reduction in the amount of credit maintained for a connection. Under some circumstances, the retransmission timer may expire when the corresponding packet was not lost. This will cause a duplicate packet to arrive at the decapsulation module [9]. If this occurs the decapsulation module [9] should not increase the amount of credit at the receiver for that connection so as to avoid inadvertently increasing the amount of credit.

Some data senders send bursts of data separated by idle periods. If the decapsulation module [9] sends all the credit back to the encapsulation module [8] but the sender does not currently have data to send, this can waste network capacity. When the encapsulation module [8] subsequently receives data from the sending protocol [7], this would cause a burst of data to be sent at high speed, irrespective of whether the link to the decapsulation module [9] was now busy with traffic from another sender. In one embodiment of the invention, the encapsulation module [8] can indicate with the last packet of the previous burst that it has no more data, and so is returning some or all of its credit to the receiver. If the encapsulation module [8] has insufficient or no credit but data arrives that for it to send, then it sends a request-to-send control packet to the receiver. The receiver then replies with a control packet conveying credit allowing the encapsulation module [8] to send one or more packets. It will be understood that this request-to-send mechanism can also be used at the start of a connection if the initial window size is set to zero. This may be useful, for example, if the encapsulation module [8] knows that many other computers [5] will be sending to the same receiving computer [5] at the same time.

It will be understood that a plurality of acknowledgements, negative acknowledgements and credit messages sent from the decapsulation module [9] to the encapsulation module [8] may be combined into a single control packet for transmission across the network [1] in order to reduce the overhead of such control packets.

Figure 3:
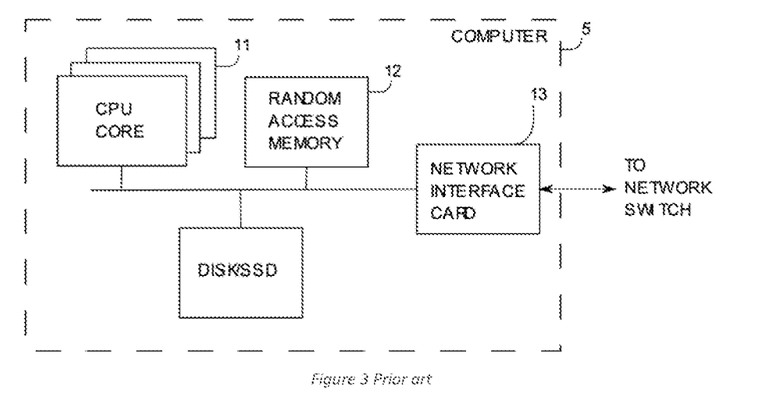
FIG. 3 shows the main components of a sending or receiving computer.

In one embodiment of the invention, the mechanisms for pacing and sending control messages from the decapsulation module [9] and for sending retransmissions or new data packets from the respective queues at the encapsulation module [8] in response to those control messages will be implemented by means of software running on a CPU core [11] of the sending or receiving computer [5], as shown in FIG. 3. This embodiment has the advantage of being able to be used without special-purpose NIC [13] hardware.

Figure 4:
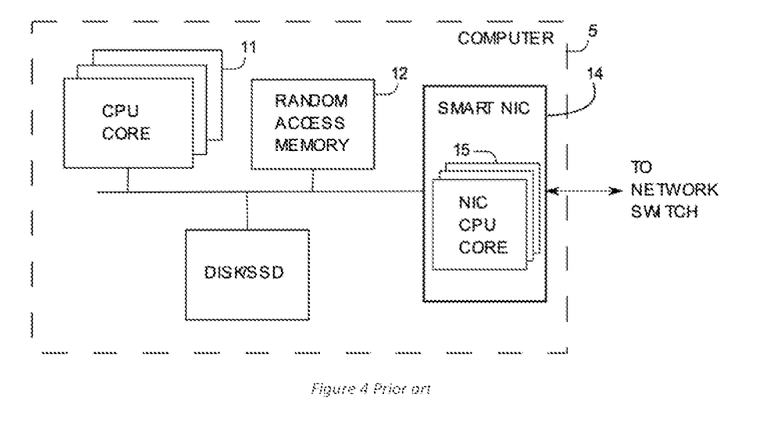
FIG. 4 shows the main components of a sending or receiving computer with a smart NIC.

In another embodiment of the invention, some of these mechanisms will be performed by the NIC [13] itself. Smart NICs [14] include their own CPU cores [15] which can run firmware allowing work to be offloaded from the CPU cores [11] of the sending or receiving computer [5]. A decapsulation offload module runs on a NIC CPU core [15] of the receiving computer's NIC [14] and a encapsulation offload module runs on a NIC CPU core [15] of the sending computer NIC[14].

At the NIC [13] of the receiving computer [5], the arrival of a data packet at the NIC [14] causes the decapsulation offload module to increase the credit score associated with the connection from the corresponding sending computer. This credit score represents the amount of the initial window that is currently stored at the receiver. The packet is then transferred via Direct Memory Access (DMA) from the NIC [13] to the main memory [12] of the receiving computer [5] in the usual manner. The arrival of a trimmed header at the NIC [13] of the receiving computer [5] also causes the decapsulation offload module to increase the credit score associated with the connection, and in addition the decapsulation offload module will generate a negative acknowledgement for the missing data and transmit it to the sending computer [5]. In this way the CPU cores [11] of the receiving computer [5] do not need to perform any work when a trimmed header arrives.

The decapsulation offload module will also generate and send the credit control messages sent on behalf of the decapsulation module [9]. The sending of these messages should be paced with high precision, so that the aggregate data rate of packets they elicit from the encapsulation modules [8] of the sending computers will arrive at approximately the bitrate of the receiving computer's network link [6]. When a credit control message is sent, transferring the corresponding about of credit to an encapsulation module [8], the credit score associated with the corresponding sending computer [5] is decreased by the corresponding amount. If the credit score for a sending computer [5] is zero, the decapsulation offload module will not send credit to that sending computer [5].

At the sending computer [5] the management of the three sending queues is shared between the encapsulation module [8] and the encapsulation offload module. New packets are first queued in the encapsulation module [8] and are only released to the encapsulation offload module when it has resources available. The retransmission queue and the sent packets queue are both handled by the encapsulation offload module. Both acknowledgements and negative acknowledgements are handled by the encapsulation offload module in the same way that the encapsulation module [8] would if it had not offloaded this functionality to the NIC [13]. In this way, the encapsulation module [8] itself does not need to handle negative acknowledgements, and only needs to handle acknowledgements if the send packets queue is held in main memory [12], whereupon it needs to free the packet buffer for use by new data.

When a credit packet arrives at the encapsulation offload module, the encapsulation offload module sends one or more retransmitted packets or new packets in the same way that the encapsulation module [8] would, had this functionality not been offloaded to the [13].

It will be understood that some or all of the functionality of the encapsulation offload module or decapsulation offload module may be implemented in a field-programmable gate array (FPGA) or an application-specific integrated circuit (ASIC) within a NIC [13], rather than purely as firmware running on a NIC CPU core [15].

In some data center networks [1], there is enough capacity on the interswitch links [3] that persistent congestion will not occur. In such data center networks [1] having a constant amount of credit circulating between the encapsulation module [8] and the decapsulation module [9 ] (or between the encapsulation offload module and the decapsulation offload module as applicable) is desirable. The main place that trimming will occur is at the switches feeding the edge link [6] to the receiving computer [5]. Such trimming will not be persistent, as the decapsulation module [9] paces the sending of credit.

In other data center networks [1], there may not be enough capacity on inter-switch links [3] for all workloads, and so congestion may occur, resulting in persistent trimming of packets. It is desirable for the decapsulation module [9] to be able to tell if this is occurring, and for it to reduce the credit sent to the encapsulation module [8] when this situation occurs. In one embodiment, when a switch trims the payload from a packet, it also copies the Time To Live field (TTL) from the IP header of the encapsulated packet into another field in the trimmed header. The IP TTL field is set to a fixed value when the packet is sent by the sending computer, and every IP-capable switch that forwards the packet will decrement the TTL. By having a switch record the value of the TTL field when a packet is trimmed, the decapsulation module [9] can tell how far across the network [1] the packet travelled before it was trimmed. If packets are mostly being trimmed at the last switch before the edge link [6] to the receiving computer [5], then the decapsulation module [9] will not decrease the credit for that sender. If packets are mostly being trimmed at an earlier switch, the decapsulation module [9] may either decrease the credit for that sender if other senders are not being trimmed, or may decrease the rate at which credit is sent to all senders if packets from many senders are being trimmed.

In other data center networks, some switches may support trimming and others may be legacy switches that do not support trimming. It is desirable for the decapsulation module [9] to discover when overload occurs in such networks and to distinguish between congestion at switches that support trimming and congestion at legacy switches. In one embodiment, legacy switches set a ECN field in the packets when congestion builds. The decapsulation module [9] module can use this ECN field as an indication of congestion, and consequently decrease credits for the associated sender to avoid continued congestion at the legacy switch. In another embodiment, the legacy switches write additional congestion information into the packet header in the form of in-band telemetry. Upon receiving such information, the decapsulation module [9] module decreases credits for the associated sender when the congestion information implies the sender is sending too fast for the present level of congestion on the network path. When congestion happens at a switch that supports trimming, the methods described above will apply.

In some data center networks [1] there is a plurality of paths between any two computers, and these paths have equal-capacity and equal-length (e.g. symmetric topologies). In such networks [1], the encapsulation module [8] can equally split the traffic across all paths by using different values in the header fields, and this will result in perfectly utilizing the network.

In other data center networks, the available paths between different computers may have different capacity and different length, either by design or as a result of failures. In such networks, equally splitting the traffic will result in reduced performance. It is desirable to keep per-path congestion information in such networks and split the traffic in such a way that it avoids congestion. In a preferred embodiment, the decapsulation module [9] keeps a per-path data structure that tracks the congestion on each path based on the rate of trimmed packets or other congestion signals received on the path. When sending credits, it will signal to the sender which path the ensuing packets should take; more credits will be allocated to paths with lower congestion. In another embodiment, the encapsulation module [8] keeps per-path data structure that tracks the congestion level of each path. This data structure is updated based on the positive and negative acknowledgements received from decapsulation module [9], with negative acknowledgements indicating higher congestion. The encapsulation module [8] will then send more traffic on paths with lower congestion.

It will thus be seen that the objects set forth above, among those made apparent from the preceding description, are efficiently attained and, because certain changes may be made in carrying out the above method and in the construction(s) set forth without departing from the spirit and scope of the invention, it is intended that all matter contained in the above description and shown in the accompanying drawings shall be interpreted as illustrative and not in a limiting sense.

It is also to be understood that the following claims are intended to cover all of the generic and specific features of the invention herein described and all statements of the scope of the invention which, as a matter of language, might be said to fall therebetween.

The invention claimed is:

1. A method of transferring data between a sending computer and a receiving computer across a packet switched communications network, wherein the data originates from a sending protocol on the sending computer and is destined for a receiving protocol on the receiving computer, the method comprising the steps of:

encapsulating data packets from the sending protocol in an additional packet header by an encapsulation module distinct from the sending protocol before the data packets leave the sending computer wherein the additional packet header contains a sequence number used to identify the data packet;

sending encapsulated data packets to the receiving computer wherein at least one packet switch of the packet switched communications network forwards the encapsulated data packets across a plurality of paths between the sending computer and the receiving computer with a path of each encapsulated data packet determined by a function of values of fields from the encapsulated data packet headers;

network switches in the packet switched communications network trimming a payload of the encapsulated data packets if too many encapsulated data packets arrive to be forwarded towards the receiving computer;

receiving the encapsulated data packets through the packet switched communications network onto the receiving computer and sending a request to the sending computer to resend trimmed data from the trimmed data packets further wherein the receiving computer sends credit control messages to the sending computer in order to control when encapsulated data packets are sent from the sending computer; and decapsulating the encapsulated data packets with a decapsulation module at the receiving computer by removing the additional packet header after the data packets arrive at the receiving computer but before they are processed by the receiving protocol.

2. The method of claim 1, characterized in that one or more steps performed by said encapsulation module are performed using a central processing unit (CPU) core that is part of a network interface card in the sending computer.

3. The method of claim 1, characterized in that the sending protocol is Transmission Control Protocol or Remote Direct Memory Access.

4. The method of claim 3, characterized in that when the sending protocol sends data packets at a higher rate than the encapsulation module permits, the encapsulation module sets congestion notification bits in the header of the packets sent to the receiving computer.

5. The method of claim 1, characterized in that the decapsulation module acts upon receipt of congestion information in Explicit Congestion Notification (ECN) bits, in-band network telemetry or congestion information that the network switches set in the forwarded packets, thereby reducing the amount of credit sent to the sending computer.

6. The method of claim 1, characterized in that credit control messages from the receiving computer to the sending computer are generated using a central processing unit (CPU) core that is part of a network interface card in the receiving computer.

7. The method of claim 1, characterized in that sending protocol is Transmission Control Protocol (TCP) and the encapsulation module controls a sending rate of the sending protocol by modifying a receive window field in TCP packets sent from the receiving protocol to the sending protocol.

8. The method of claim 1, characterized in that the sending protocol is a Remote Direct Memory Access protocol and that when said Remote Direct Memory Access protocol sends faster than the encapsulation module permits, the encapsulation module sends pause frames to the Remote Direct Memory Access protocol to control the sending protocol sending rate.

9. The method of claim 1, characterized in that the packet switch, upon trimming a packet, also copies additional information into the data packet header, whereby the receiving computer, upon receiving said additional information, can determine how far along the path through the packet switched communication network the trimming occurred.

10. The method of claim 1, characterized in that the sending protocol is Transmission Control Protocol and further characterized in that a reorder buffer is used at the receiving computer to place the encapsulated data packets that traveled via different paths back in an order in which the encapsulated data packets were sent before the encapsulated data packets are processed by the receiving protocol.

11. The method of claim 1, characterized in that negative acknowledgement messages from the receiving computer to the sending computer are generated by a network interface card in the receiving computer.

12. A method of transferring data between a plurality of sending computers and a receiving computer across a packet switched communications network, whereby the receiving computer controls both an aggregate rate of data sent by the plurality of sending computers and fractions of the aggregate rate sent by each sending computer of the plurality of sending computers, the method comprising the steps of:
encapsulating data sent by the plurality of sending computers using an encapsulation module, the encapsulation module maintaining a queue of packets to send and controlling when packets are released to the network for transmission to a decapsulation module at the receiving computer wherein at least one packet switch of the packet switched communications network forwards the encapsulated data packets across a plurality of paths between the sending computers and the receiving computers with a path of each encapsulated data packet determined by a function of values of fields from the encapsulated data packet headers;
the receiving computer maintaining a credit total for each sending computer corresponding to an amount of data that sending computer wishes to send at that time;
the receiving computer sending credit control messages to each of the sending computers in order to control when encapsulated data packets are sent from the sending computers and the amount of data that can be sent, the encapsulation module at the sending computer sending a quantity of data corresponding to said credit; and
the receiving computer sending an aggregate amount of credit that is not more than an amount of data that it is capable of receiving during a next time interval, and the receiving computer sending credit to each sending computer of the plurality of sending computers according to a receiver's priority for receiving that data.

13. The method of claim 12, characterized in that one or more network switches in the packet switched communications network to trims a payload from data packets sent from the plurality of sending computers if too many data packets arrive to be forwarded towards the receiving computer.

14. The method of claim 13, characterized in that the plurality of sending computers send a burst of data without waiting for credit from the receiving computer, but thereafter are controlled by the receiving computer sending credit messages.

15. The method of claim 13, characterized in that upon receipt of trimmed data packets, a network interface card in the receiving computer sends negative acknowledgement messages without involvement of a central processing unit (CPU) in the receiving computer.

16. The method of claim 12, characterized in that before sending data a sending computer of the plurality of sending computers sends a message to the a receiving computer of the plurality of receiving computers informing the receiving computer how much data that sending computer wants to send.

17. The method of claim 16, characterized in that a sending computer of the plurality of sending computers may store credit given by a receiving computer of the plurality of receiving computers and later use this credit to send.

18. The method of claim 12, characterized in that control messages from the a receiving computer of the plurality of receiving computers to the plurality of sending computers are generated using a central processing unit (CPU) core that is part of a network interface card in the receiving computer.

19. A method of transferring data between a first computer and a second computer across a packet switched communications network, whereby data originates from a sending protocol, the method comprising:
encapsulating data packets from the sending protocol with an additional packet header by an encapsulation module wherein at least one packet switch of the packet switched communications network forwards the encapsulated data packets across a plurality of paths between the first computer and the second computer with a path of each encapsulated data packet determined by a function of values of fields from the encapsulated data packet headers;
the encapsulating module requesting permission to send a required amount of data from said second computer, network switches in said packet switched network using fields from said additional packet header to determine which of a plurality of paths to use to forward each packet towards said second computer;
the encapsulation module varying the fields so as to balance load across the plurality of paths; and sending the encapsulated data packets to the second computer further wherein second computer sends credit control messages to the first computer in order to control when encapsulated data packets are sent from the first computer.

* * * * *